United States Patent [19]

Ohno

[11] Patent Number: 4,504,284
[45] Date of Patent: Mar. 12, 1985

[54] INDEXABLE COMPOSITE CUTTING INSERT HAVING CORNER CUTTING EDGES

[75] Inventor: John M. Ohno, Plymouth, Mich.

[73] Assignee: General Electric Company, Detroit, Mich.

[21] Appl. No.: 286,613

[22] Filed: Jul. 24, 1981

[51] Int. Cl.³ .............................................. B24D 3/02
[52] U.S. Cl. ........................................ 51/309; 51/293; 51/308
[58] Field of Search ........................... 51/293, 308, 309

[56] References Cited

U.S. PATENT DOCUMENTS

| | | | |
|---|---|---|---|
| 2,938,807 | 5/1960 | Anderson | 106/44 |
| 3,471,276 | 10/1969 | Bragan, Jr. | 51/293 |
| 4,124,401 | 11/1978 | Lee et al. | 106/44 |
| 4,167,399 | 9/1979 | Lee et al. | 51/307 |
| 4,173,614 | 11/1979 | Lee et al. | 264/332 |
| 4,220,455 | 9/1980 | St. Pierre | 51/295 |
| 4,238,433 | 12/1980 | Hillig et al. | 264/257 |
| 4,242,106 | 12/1980 | Morelock | 51/307 |
| 4,369,046 | 1/1983 | Bruschek et al. | 51/293 |

Primary Examiner—Donald E. Czaja
Assistant Examiner—W. Thompson
Attorney, Agent, or Firm—Hedman, Gibson, Costigan & Hoare

[57] ABSTRACT

An indexable composite cutting insert which is generally polygonal in plan view and includes spaced upper and lower surfaces, is composed of a core, such as a SiC-Si composite material, with the corners along one surface of the composite cutting insert being made of a superhard material of diamond or cubic boron nitride crystals bonded to the core. The limited use of superhard crystals in the critical areas of the cutting edges of the insert results in significant cost savings, both in manufacturing costs and costs of materials, as well as minimum warpage of the insert. In addition, improved wear resistance of the cutting edges of the insert is obtained.

9 Claims, 11 Drawing Figures

INDEXABLE COMPOSITE CUTTING INSERT HAVING CORNER CUTTING EDGES

BACKGROUND OF THE INVENTION

It is desirable for cutting inserts to be capable of high temperature operation, be resistant to wear, be shock-resistant, and be tough in order to prevent chipping or cracking during a milling or cutting operation. In the manufacture of silicon carbide components, it is known to manufacture high-temperature wear parts of sintered silicon carbide materials, as for example, as disclosed in U.S. Pat. No. 2,938,807 of Anderson. In the latter patent, β-silicon carbide is described as an excellent binder, however, no diamond is incorporated in this silicon carbide technology.

A useful component of these materials would be superhard crystals such as diamond or cubic boron nitride. Their superior properties of, for example, hardness, have long been appreciated. The prior art of bonding diamond crystals usually depends on hot-press technology, and for this art reference is made to U.S. Pat. No. 4,124,401 to Lee et al, U.S. Pat. No. 4,167,399 to Lee et al, and U.S. Pat. No. 4,173,614 to Lee et al, all of which patents are assigned to the assignee of the present invention. Reference is also made to U.S. Pat. No. 4,220,455 which issued to St. Pierre, et al, and which is also assigned to the assignee of the present invention. The latter patent discloses a process for making a homogeneous diamond composite throughout an article, wherein individual crystals are coated, and Si is infiltrated into a porous preform indirectly through a wick material.

Many of the problems associated with the prior art processes for making composite cutting inserts have been overcome by the inventions disclosed in U.S. patent applications, Ser. No. 167,196 filed July 9, 1980 and Ser. No. 167,019 filed July 9, 1980 now abandoned and Ser. No. 227,228 filed Jan. 22, 1981 by John Michio Ohno. The disclosures of these applications are incorporated herein by reference. In brief, they describe bilayer diamond composites having a special binder of β-silicon carbide and Si. That binder forms a matrix throughout the composite so as both to hold the diamond crystals and to unite the composite layers. Reference is also made to U.S. patent application Ser. No. 226,604 filed Jan. 21, 1981 by John Michio Ohno which discloses an improved silicon carbide composite and process for production of same. The bonded composite disclosed in the latter application comprises at least one layer containing diamond or cubic boron nitride crystals and forming a complete envelope about the core. The superhard envelope which is formed about the core defines the cutting edge of the cutting insert.

The subject invention is a further improvement in the cutting insert disclosed in the above identified patent application of John Michio Ohno and more particularly a cutting insert which uses superhard crystals in very limited critical areas, namely the cutting edges, whereby most of the side surfaces and top surface of the improved cutting insert are not covered by expensive, superhard crystal layers, thereby realizing a significant cost savings and improved performance of the subject cutting insert.

SUMMARY OF THE INVENTION

In the cutting insert according to the subject invention, the insert has an indexable polygonal body including spaced upper and lower surfaces, which may be parallel. The core portion of the body is a composite material preferably formed of a mixture of filler (submicron β SiC), carbon fiber and carbon black and is essentially free of diamond or cubic boron nitride crystals, while the corners along either the upper or lower surface of the body are made of diamond or cubic boron nitride crystals that are bonded to the composite by a β-silicon carbide and Si matrix. By this construction of the subject cutting insert, the superhard crystals are only utilized in the small critical areas, namely the cutting edges, of the cutting insert, such that most of the side surfaces and face surface of the cutting insert are not covered with the superhard crystal layers. As a result, the use of superhard crystals in the subject cutting insert is approximately 12%, by weight of the composite, and is only approximately 30% to 40% of the amount by weight of superhard crystals required in the cutting insert disclosed in the above mentioned patent application, Ser. No. 226,604 filed Jan. 21, 1981 of John Michio Ohno. Hence, the new and improved cutting insert of the subject invention achieves significant cost savings by requiring reduced quantities of expensive, superhard crystals, as well as reduced manufacturing costs, especially with respect to finish grinding requirements. In fact, it has been found that no grinding of the subject cutting insert is needed except to achieve the nose radii for the cutting edges of the cutting insert. Furthermore, the elimination of the top layer or top envelope of the cutting insert as disclosed in the above identified application of John Micho Ohno greatly minimizes warpage problems in the subject cutting insert. Preferably, the cutting insert of the subject invention is formed with an interface between the superhard cutting corners and the core composite, whereby the use of the interface eliminates drastic changes or gradients in the composition of the cutting insert structure which, of course, is desirable. Still further, the interfaces aid in achieving bonds of high integrity between the core and the superhard cutting edges. The resulting cutting insert according to the subject invention is particularly recommended for high speed finish machining of abrasive materials such as Al-Si alloys.

DETAILED DESCRIPTION OF THE INVENTION

Figure 1:
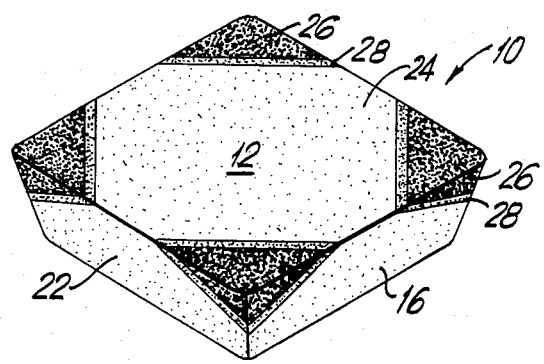
FIG. 1 is a perspective view of the new and improved cutting insert according to the subject invention.
Figure 2:
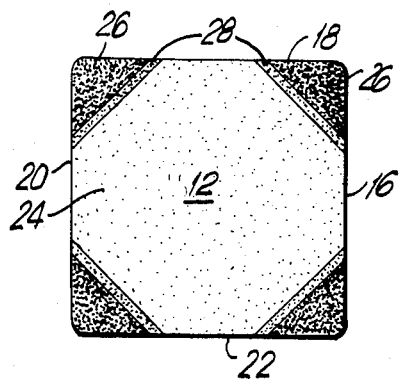
FIG. 2 is a top plan view of the new and improved cutting insert of the subject invention.
Figure 3:
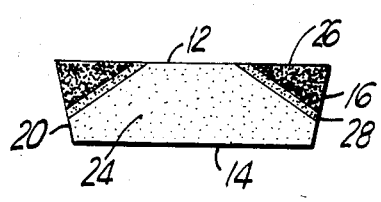
FIG. 3 is a side elevational view of the new and improved cutting insert of the subject invention.

Referring to FIGS. 1 through 3, the new and improved indexable composite cutting insert according to the subject invention is generally designated by the numeral 10. The latter is polygon in plan view, such as square, rectangular, triangular, or diamond shaped. As illustrated in the figures, in the preferred embodiment of the invention, insert 10 is square and includes upper 12 and lower 14 surfaces which are parallel and in spaced relationship. Side walls 16, 18, 20 and 22 extend about the periphery of the insert 10 and are slightly angled so as to define a positive rake cutting insert (see FIG. 3). The cutting insert 10 is formed of a central core 24, at least one, and preferably four corners 26 disposed along the upper surface 12 of the cutting insert 10 and made of a superhard material, and an interface layer 28 between each corner and the core 24. The cutting edges of the cutting insert 10 are defined by the corners 26 made of the superhard material.

U.S. patent application Ser. No. 226,604 filed Jan. 21, 1981 of John Michio Ohno discloses the new and improved process for forming, respectively, the mixture and dispersions for forming the core 24, and the interface diamond layer 28 and the superhard corners 26. The mixture for forming the core 24 basically comprises carbon black, filler, and carbon fiber which are blended, and to which paraffin is added, prior to compacting, as more fully described hereinafter. Generally, the mixture for forming the core 24 contains from about 3 to 6% paraffin, and 2 to 4% carbon black by weight, with the amount, quality and type of carbon black being important in that, for example, sulfur contamination in carbon black should be avoided. The carbon fiber employed in the core mixture 24 is desirably of very small size to facilitate homogeneous admixture and, in particular, to facilitate the fining operation preparatory to compacting of the core mixture 24. The sizes of carbon fiber are preferably of from 6 to 30 microns in diameter, and from 250 to 500 microns in length. The filler in the mixture for the core 24 is provided to increase bulk and also to improve the compressibility of the powder mix containing fiber. It is highly desirable for a number of applications. Although such a filler may comprise any material which is stable under the conditions to which it is subjected during sintering and use, fine $\alpha$- or $\beta$-silicon carbide, or a mixture thereof is employed. Ordinarily, from 40 to 75% of filler by total weight of the mixture for forming the core 24 is employed.

The dispersions for forming the interface layer 28 and the superhard corners 26 basically comprise diamond crystals and carbon black which are thoroughly blended to permit an even distribution. In the case of the interface layer 28 in addition to diamond crystals and carbon black, uncoated carbon fiber from about 10% to 20%, by weight, may be added. In lieu of diamond crystals, cubic boron nitride crystals may be employed. The superhard crystals should preferably be small, having a size less than 400 mesh. Crystals of this preferred size will, when bonded with $\beta$-silicon carbide, exhibit superior resistance to chipping, and in addition, they provide sharp edges having desirable relief angles for cutting inserts. In the case of the interface layer 28, the dispersion preferably comprises diamond or cubic boron nitride crystals from 80% or less, by weight, to which is added the uncoated carbon fiber from 10 to 20% by weight, and carbon black, from 3 to 5% by weight. The paraffin, added to the dispersion for the interface layer 28 preferably comprises from 4 to 6% by weight. The dispersion for the corners 26 comprises superhard crystals, such as diamond or cubic boron nitride crystals, which are added to carbon black. Preferably, the dispersions for the corners 26 contains from about 80 to 95% diamond, by weight.

In the dispersions for forming the interface layer 28 and the corners 26, to the superhard crystals such as diamond or cubic boron nitride crystals, must be added the carbon black, and paraffin to aid in compaction. This carbon black in the corners 26 and the carbon black and fiber in the interface 28 serve subsequently by reacting to yield $\beta$-silicon carbide for the bonding matrix of the cutting insert composite 10. The carbon black is desirably of high purity to reduce the presence of contaminants and in particular, its sulfur content should be low to avoid possible side reactions during subsequent processing. Although varying amounts of carbon black are permissible, in the case of the dispersion for the corners 26, from 1% to 3%, most preferably about 2%, by weight of carbon black to the superhard crystals is permissible, and this range has proven optimum.

The paraffin utilized in the dispersions and in the mixture for forming the core 24, may be any of the hydrocarbon waxes encompassed by the common meaning of this term. Again, a high purity hydrocarbon should be employed to avoid possible harmful residue. For ease of admixture, a liquid paraffin is employed, however, this may be accomplished by operating under a temperature sufficiently high to melt a paraffin which is ordinarily solid under ambient conditions. The amount of paraffin employed is a small but effective amount to aid in admixture and is then removed. This generally constitutes from 3 to 6% by total weight of each dispersion. Further details concerning the process for forming the new and improved mixture and dispersions utilized in manufacturing the cutting insert 10 of the subject invention are disclosed in the above mentioned patent application, Ser. No. 226,604 filed Jan. 21, 1981 of John Michio Ohno, the disclosure which is incorporated herein by reference.

Figure 4:
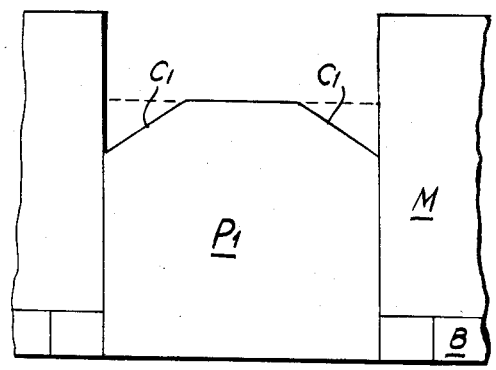
FIGS. 4, 5, 6, 7, and 8 are sequential, illustrative depictions of a preferred approach and specific apparatus useful in making the cutting insert of the subject invention.
Figure 5:
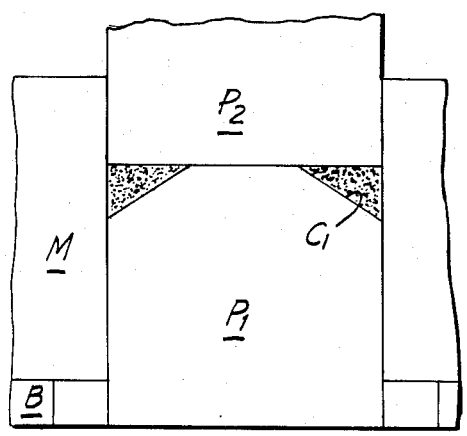
Figure 6:
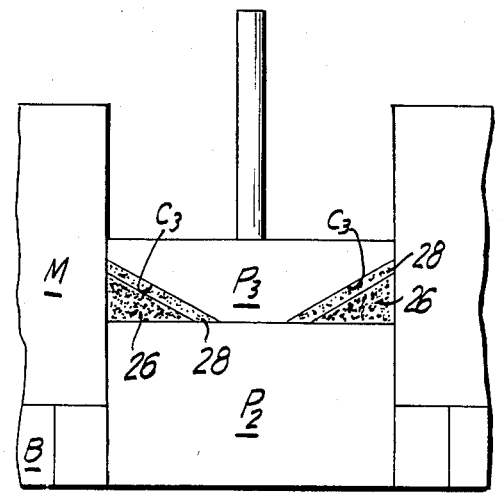
Figure 7:
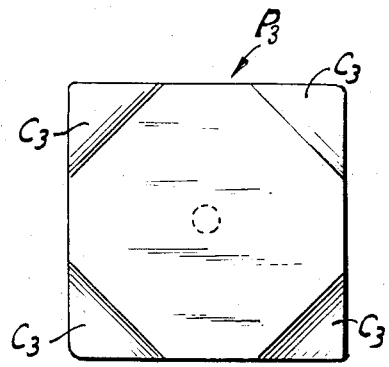
Figure 8:
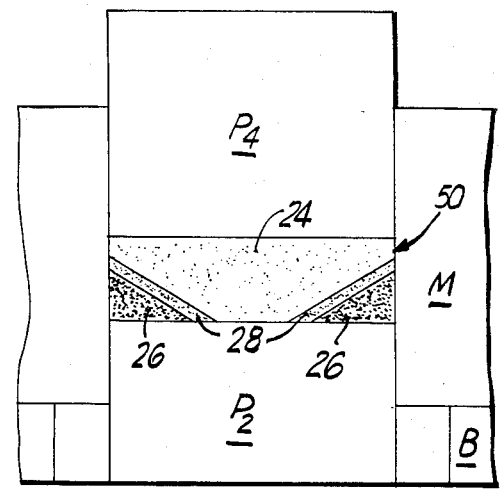

Referring to FIG. 4, the apparatus which may be employed in manufacturing a square cutting insert 10 of negative rake according to the subject invention includes mold M which is shown in cross-section and is mounted on a base B. Mold M contains a tightly fitting, square plunger $P_1$ which has four generally pyramidal shaped cut-outs disposed at the respective corners thereof, with the cut-outs being designed by $c_1$. As shown in FIG. 5, each of the cut-outs $c_1$ is filled with the dispersion for forming the superhard corners 26. The dispersion 26 is filled into each cut-out portion $c_1$, after which a square, flat plunger $P_2$ is placed inside the square mold M and provides sufficient compression for the initial compaction of the corner dispersions 26. Next, the assembly of the mold M and the plungers $P_1$ and $P_2$ is inverted, after which the plunger $P_1$ is removed. The dispersion for forming the interface 28 is then placed into the mold M thereby covering the compacted corners 26, and a plunger $P_3$ is then placed into the mold. FIG. 7 illustrates the bottom plan view of the plunger $P_3$ which includes angled or chamfered corner portions $c_3$ corresponding to the configuration of the corner portions 26 of superhard material. Following compaction of the dispersions for forming the corners 26 and the interface layer 28, plunger $P_3$ is removed, after which the mixture for forming the core 24 is placed into the mold M. Then, as illustrated in FIG. 8, a plunger $P_4$ is fitted into the mold, with the face of the plunger $P_4$ being generally parallel to the face of the plunger $P_2$. Upon the application of high pressure by plunger $P_4$, the two dispersions 26 and 28, as well as the mixture 24, are tightly pressed to form a stable green compact, designated by the numeral 50 in FIG. 8. The green compact 50 is subsequently ejected from the mold M by advancement of plunger $P_2$. After ejection from the mold M, the compact 50 is composed of the compressed layers of dispersions 26 and 28, as well as mixture 24 and is in a form suitable for further processing, in accordance with the disclosure of U.S. Letters patent application No. 226,604 filed Jan. 21, 1981. More particularly, once molded to the desired shape, the compact 50 is subjected to vacuum and temperature conditions sufficient to vaporize the paraffin from its entire volume. Generally, a pressure of less than 200 microns and temperature of about 500° C. are utilized. Alternatively, another temperature and a correspondingly varied vacuum may be employed.

The vaporization of the paraffin is preferably conducted slowly, and this avoids, for example, violent boiling and/or build-up of gaseous pressure within the composite 50. Accordingly, conditions requiring at least ten minutes, and preferably from ten to fifteen minutes for the essentially complete removal of the paraffin are preferred.

The compacted mixture is next infiltrated with liquid silicon. There must be sufficient elemental silicon present to permit, under the conditions of sintering, infiltration of silicon to, and reaction with, substantially all of the carbon black and carbon fiber of the compact. There may also be excess silicon. It is not detrimental if, after sintering, a small amount of free silicon remains within the resulting composite. Up to about 14%, preferably from 5 to 12%, excess silicon is even desirable to insure substantially complete reaction in the mixture and Si diffusion into the superhard crystal corners 26 to react with carbon black in the crystal boundary. An optimum amount of silicon may be readily determined by experimentation prior to undertaking mass production of the subject invention whereby a smooth and clean surface may be produced without excess residue on the surfaces of the cutting inserts.

The operation of bonding the compact to create a composite actually involves a series of steps, all of which may occur essentially simultaneously. These steps include melting of the silicon, infiltration of molten silicon into the compacted mixture, and reaction of the diffused silicon with the carbon black and fiber, in order to produce $\beta$-silicon carbide throughout the resulting composite cutting insert.

To induce this last set of reactions between silicon and carbon, a minimum temperature of at least about the molten temperature of silicon, i.e., about 1450° C. is required. Higher temperatures may also be utilized. However, a maximum of about 1500° C. is preferred in order to avoid graphitization of the diamond crystals. Normally, the compact should be maintained at a temperature within this range for at least ten minutes at 1490° C., preferably approximately 60 minutes at 1450°-1490° C. This ensures substantially complete reaction of available carbon black and carbon fiber with infiltrated silicon in the mixture and diffusion sintering of the superhard corners 26. Consequently, the entire operation may proceed essentially simultaneously under a single set of conditions or in a sequential, step-wise progression, as desired.

Once reaction between carbon black and carbon fiber with silicon has essentially ceased, the bonded cutting insert preform may be cooled. Since the composite cutting insert preform is formed in the desired shape, it is ready for bonding onto a substrate, thereby obviating the requirements for extensive finish grinding.

During sintering, the different materials of the composite cutting insert preform undergo unequal amounts of volume change. This change is largely a function of the chemical reaction which takes place between carbon and silicon to produce $\beta$-silicon carbide in each layer. By employing the intermediate interface layer 28, this problem is essentially obviated since the use of the interface layer 28 substantially eliminates drastic change in structure, and this is highly desirable. Along the same lines, warpage is substantially reduced, especially in view of the fact that the subject cutting insert 10 includes four discrete cutting corners 26 of superhard materials, and it is usually in the layers of superhard crystals that stress, as revealed by warpage, is usually induced. Through the use of four discrete corners of superhard crystals, which corners are separated as shown in FIGS. 1 through 3, stress and hence warpage, are substantially eliminated in the cutting insert 10 of the subject invention.

Figure 9:
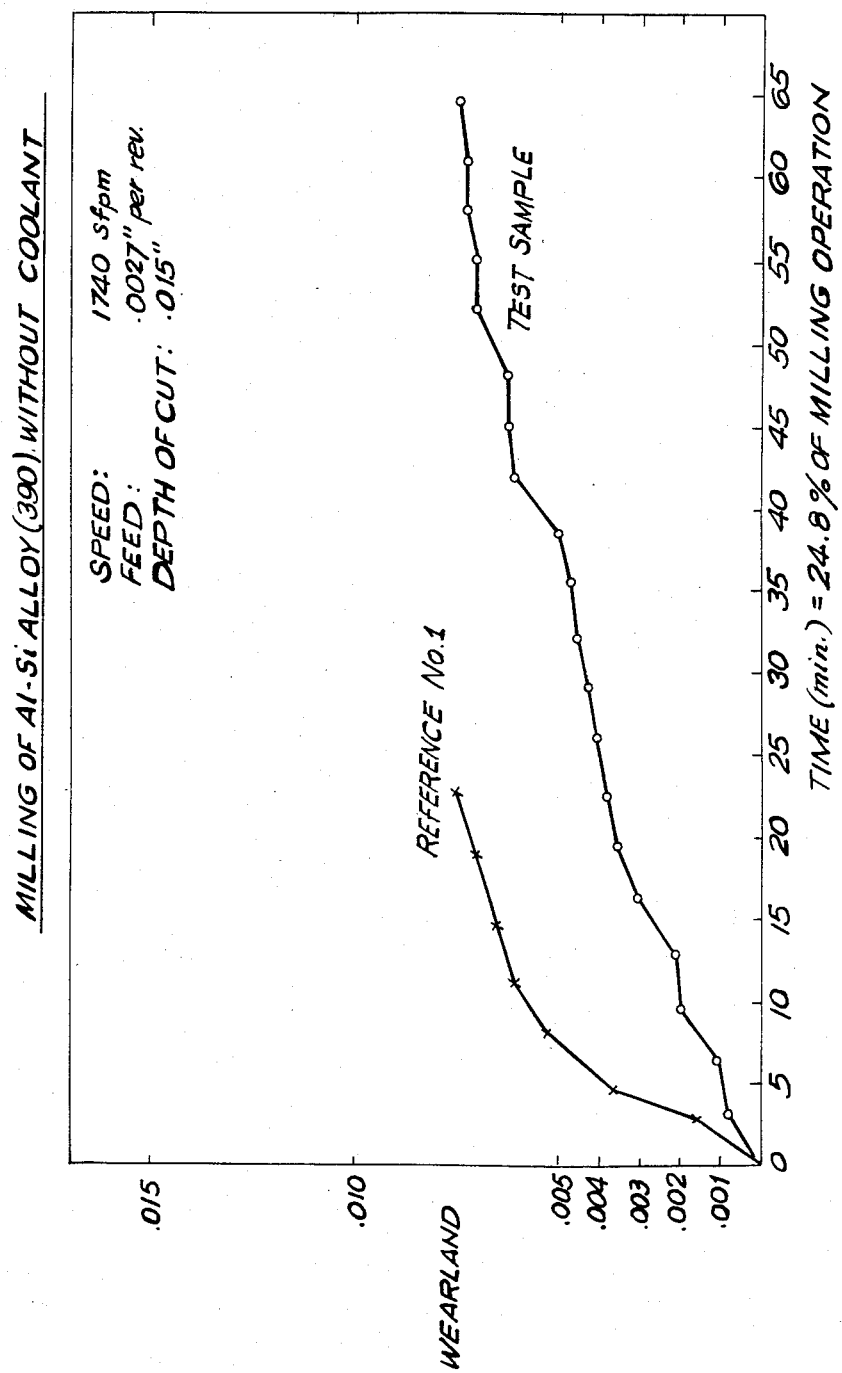
FIGS. 9, 10, and 11 are graphs of the results of comparative testing of a sample insert made according to the subject invention and reference cutting inserts.
Figure 10:
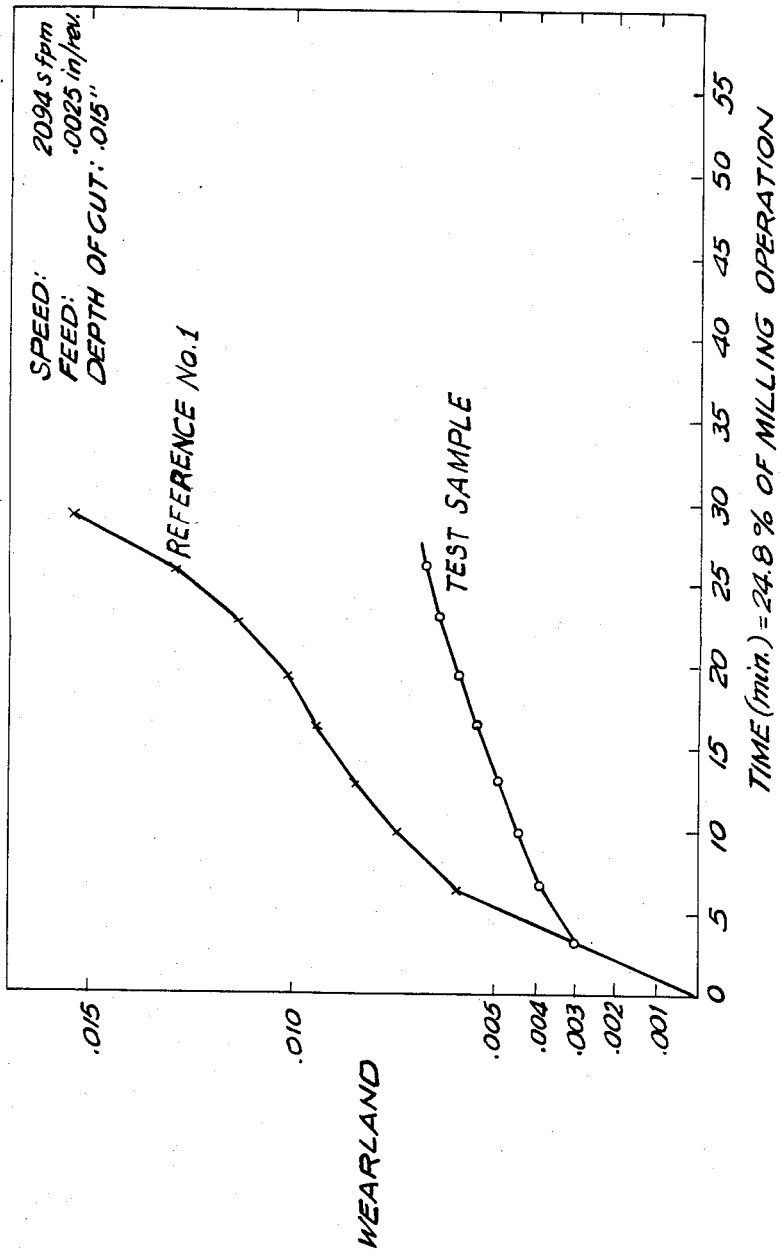
Figure 11:
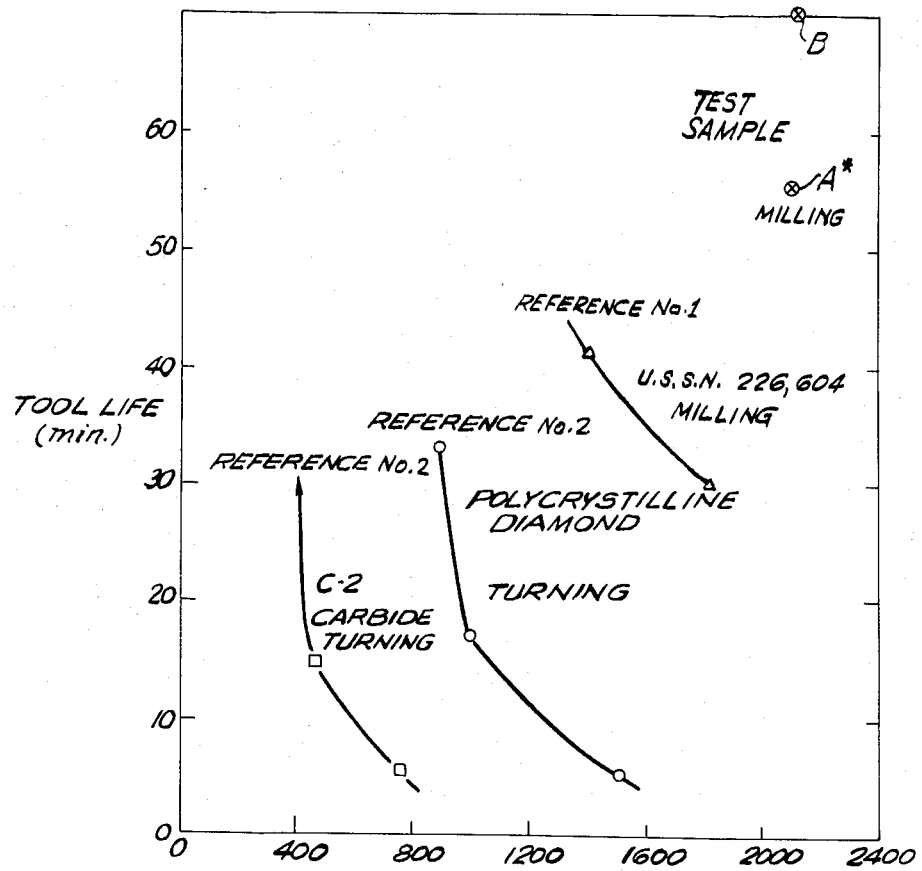

FIGS. 9 through 11 illustrate comparative data of high speed finish machining tests conducted utilizing the new and improved cutting inserts 10 of the subject invention. FIGS. 9 and 10 are two examples showing the definite improvement in wear resistance of the cutting insert sample 10 (designated "TEST SAMPLE") of the subject invention, as compared to a cutting insert (designated "REFERENCE No. 1"), as disclosed in U.S. patent application Ser. No. 226,604 filed Jan. 21, 1981 of John Michio Ohno. In the finish machining test results as shown in FIG. 9, the cutting speed was 1740 surface feet per minutes, whereas in the test results depicted in FIG. 10, the cutting speed was 2094 surface feet per minute. FIG. 10 gramatically illustrates the reduced wear of the cutting insert edges of the subject invention, as compared to the wear exhibited by the cutting insert ("REFERENCE No. 1") made according to the teachings of U.S. patent application Ser. No. 226,604, mentioned above.

FIG. 11 illustrates comparative data of the subject cutting insert as compared to standard cutting inserts, designated "REFERENCE No. 2", and specifically identified, said data being set forth in the publication of the Defence Contract Adminstration Services, Machinability Data Center operated by Metcut Research Associates, Inc. under U.S. Government Contract No. DSA990-77-C-3197, distributed July 1978. The test data points recorded for the cutting insert 10 of the subject invention are designated by the letters A, and B, and the dramatic improvement in tool life as a function of cutting speed is clearly illustrated in FIG. 11. In summary, as indicated by the comparative test results of FIGS. 9 through 11, the subject cutting insert 10 is more efficient and exhibits a substantially longer tool life at higher cutting rates than the prior art inserts.

The above identified patents and/or patent applications are incorporated herein by reference. Obviously, it is understood that changes may be made in the particular embodiment of this invention in the light of the above disclosure. These changes are also within the scope of the invention as defined by the appended claims.

I claim:

1. A cutting insert comprising a body of polygonal configuration having spaced upper and lower surfaces, said body member having side walls extending between said upper and lower surfaces, said body member having a core comprised of a filler, carbon fiber and carbon black, and at least one cutting edge portion disposed at a corner of said body member defined by the intersection of two of said side walls and said upper or lower surface, with said cutting edge portion being made of diamond or cubic boron nitride crystals and united to said core by an α- or β-silicon carbide, or mixtures thereof, and Si matrix said core being essentially free of diamond or cubic boron nitride crystals.

2. A cutting insert as in claim 1 further including an interface layer between said core and said cutting edge portion, said interface layer also made of diamond or cubic boron nitride crystals of less density, by weight, than the amount of diamond or cubic boron nitride crystals in said cutting edge portion.

3. A cutting insert as in claim 2 wherein said interface layer contains less than 80% diamond or cubic boron nitride crystals, by weight, while said corner cutting edge portion contains between 80-95% diamond or cubic boron nitride crystals, by weight.

4. A cutting insert as in claim 2, wherein said interface layer is formed of a dispersion including uncoated diamond or cubic boron nitride crystals, uncoated carbon fiber, carbon black, and paraffin.

5. An indexable cutting insert comprising a body member of square configuration having upper and lower surfaces that are generally parallel, said body member having side walls extending between said upper and lower surfaces, said body member having a core comprised of a filler, carbon fiber and carbon black and four cutting edge portions respectively disposed at the corners of said body member as defined by the intersections of said side walls and said upper or lower surface, said body member further including an interface layer disposed between each said corner cutting edge portion and said core, with said cutting edge portions and said interface layer being made of diamond or cubic boron nitride crystals and united to said core by an α- or β-silicon carbide, or mixtures thereof, and Si matrix wherein said interface layer contains less than 80% diamond or cubic boron nitride crystals, by weight, while said corner cutting edge portions contain between 80-95% diamond or cubic boron nitride crystals, by weight.

6. An indexable cutting insert as in claim 5 wherein said core is formed of a mixture which comprises carbon fiber, carbon black, and SiC filler crystal.

7. An indexable cutting insert as in claim 5 wherein said core is essentially free of diamond or cubic boron nitride crystals.

8. An indexable cutting insert as in claim 5 wherein said interface layer is formed of a dispersion including uncoated diamond or cubic boron nitride crystals, uncoated carbon fiber, carbon black, and paraffin.

9. An indexable cutting insert as in claim 5 wherein said cutting edge portions and said interface are united to said core by a β-silicon carbide and Si matrix.

* * * * *